US011729434B2

(12) United States Patent
Hou

(10) Patent No.: US 11,729,434 B2
(45) Date of Patent: *Aug. 15, 2023

(54) METHODS AND SYSTEMS FOR DYNAMIC ROUTING OF CONTENT USING A STATIC PLAYLIST MANIFEST

(71) Applicant: Pluto Inc., West Hollywood, CA (US)

(72) Inventor: Chan V. Hou, Long Beach, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,332

(22) Filed: Sep. 28, 2022

(65) Prior Publication Data

US 2023/0013326 A1   Jan. 19, 2023

Related U.S. Application Data

(63) Continuation of application No. 17/451,715, filed on Oct. 21, 2021, now Pat. No. 11,463,741, which is a (Continued)

(51) Int. Cl.
*H04N 21/234* (2011.01)
(52) U.S. Cl.
CPC .................................. *H04N 21/234* (2013.01)
(58) Field of Classification Search
CPC ............... H04N 21/222; H04N 21/234; H04N 21/25883; H04N 21/2668; H04N 21/6125;
(Continued)

(56) References Cited

U.S. PATENT DOCUMENTS 5,411,493 A * 5/1995 Rodriguez ................ A61F 7/02
604/290
6,378,129 B1 4/2002 Zetts
(Continued)

FOREIGN PATENT DOCUMENTS

WO    WO 2011/106601 A2    9/2011

OTHER PUBLICATIONS

European Search Report regarding Application No. EP 20 20 5539, dated Feb. 18, 2021, 8 pages.

*Primary Examiner* — Michael B. Pierorazio
(74) *Attorney, Agent, or Firm* — Knobbe, Martens, Olson & Bear LLP

(57) ABSTRACT

Systems and methods enable video on demand playback startup times to be reduced. A redirect database is populated with redirect locators. A request from a device for an item of primary video content is received. A static manifest file is generated including locators corresponding to the requested item of primary video content and redirect database entries storing redirect locators to default interstitial media. The static manifest file is transmitted to the device. Potential items of interstitial media are identified by sources of interstitial media, and a first item of interstitial media is selected. A redirect locator in the redirect database is replaced with a redirect locator corresponding to the selected interstitial media. A request is received from the device directed to the redirect database location storing the redirect locator corresponding to the selected interstitial media. The selected interstitial media is streamed to the device.

30 Claims, 9 Drawing Sheets

Related U.S. Application Data continuation of application No. 17/077,168, filed on Oct. 22, 2020, now Pat. No. 11,178,433.

(60) Provisional application No. 62/938,633, filed on Nov. 21, 2019.

(58) Field of Classification Search
CPC ............. H04N 21/812; H04N 21/8456; H04N 21/8586
See application file for complete search history.

(56) References Cited

U.S. PATENT DOCUMENTS

| | | | |
|---|---|---|---|
| 6,423,047 B1* | 7/2002 | Webster | A61F 13/505 604/397 |
| 6,625,811 B1 | 9/2003 | Kaneko | |
| 6,982,780 B2* | 1/2006 | Morley | H04N 21/41415 352/38 |
| 8,005,826 B1 | 8/2011 | Sahami | |
| 8,418,195 B1 | 4/2013 | Page | |
| 8,483,393 B2* | 7/2013 | Robert | H04N 21/63345 380/278 |
| 8,533,761 B1 | 9/2013 | Sahami | |
| 8,572,649 B1 | 10/2013 | Gossweiler, III | |
| 8,578,042 B2 | 11/2013 | Hu | |
| 8,631,440 B2 | 1/2014 | Gossweiler, III | |
| 8,745,023 B2 | 6/2014 | Libin | |
| 8,826,443 B1 | 9/2014 | Raman | |
| 9,130,918 B2 | 9/2015 | Picconi | |
| 9,258,589 B2 | 2/2016 | Grouf et al. | |
| 9,301,020 B2* | 3/2016 | Sun | H04N 21/8456 |
| 9,584,874 B1* | 2/2017 | Farias | H04N 21/44213 |
| 9,613,042 B1 | 4/2017 | Joseph | |
| 9,699,515 B2 | 7/2017 | Grouf et al. | |
| 9,712,884 B2 | 7/2017 | Grouf et al. | |
| 9,998,787 B2 | 6/2018 | Grouf et al. | |
| 10,104,445 B2* | 10/2018 | Patel | G11B 27/10 |
| 10,231,018 B2 | 3/2019 | Grouf et al. | |
| 10,327,037 B2 | 6/2019 | Shanson et al. | |
| 10,356,447 B2 | 7/2019 | Shanson | |
| 10,356,480 B2 | 7/2019 | Hou et al. | |
| 10,560,746 B2 | 2/2020 | Grouf et al. | |
| 10,681,431 B2* | 6/2020 | Levy | H04N 21/2381 |
| 10,715,848 B2 | 7/2020 | Hou | |
| 10,820,066 B2* | 10/2020 | Caulfield | H04N 21/26258 |
| 10,902,474 B2* | 1/2021 | Lo | H04L 65/765 |
| 2002/0038457 A1 | 3/2002 | Numata | |
| 2002/0121273 A1* | 9/2002 | Nyilas | A41D 13/1245 128/99.1 |
| 2003/0212708 A1 | 11/2003 | Potrebic | |
| 2004/0088737 A1* | 5/2004 | Donlan | H04N 7/165 725/135 |
| 2004/0255328 A1 | 12/2004 | Baldwin et al. | |
| 2006/0271959 A1 | 11/2006 | Jacoby | |
| 2007/0294710 A1* | 12/2007 | Meesseman | H04L 41/22 719/328 |
| 2007/0294734 A1* | 12/2007 | Arsenault | H04N 21/25875 725/87 |
| 2008/0114880 A1* | 5/2008 | Jogand-Coulomb | H04L 61/30 709/227 |
| 2008/0194276 A1* | 8/2008 | Lin | H04L 61/5014 455/466 |
| 2008/0235733 A1 | 9/2008 | Heie | |
| 2008/0270462 A1* | 10/2008 | Thomsen | G06F 16/2471 |
| 2008/0271078 A1 | 10/2008 | Gossweiler | |
| 2008/0271080 A1 | 10/2008 | Gossweiler | |
| 2009/0070819 A1 | 3/2009 | Gajda | |
| 2009/0133090 A1* | 5/2009 | Busse | H04N 21/4755 725/132 |
| 2010/0021512 A1* | 1/2010 | Arron | A61L 15/46 424/404 |
| 2010/0138297 A1* | 6/2010 | Fitzgerald | G06Q 30/0255 715/764 |
| 2010/0138298 A1* | 6/2010 | Fitzgerald | H04L 63/10 705/14.58 |
| 2010/0299264 A1* | 11/2010 | Berger | G06Q 30/0601 705/59 |
| 2010/0325657 A1 | 12/2010 | Sellers | |
| 2011/0126251 A1 | 5/2011 | LaFreniere | |
| 2011/0126258 A1 | 5/2011 | Emerson | |
| 2011/0296048 A1 | 12/2011 | Knox | |
| 2012/0110621 A1 | 5/2012 | Gossweiler, III | |
| 2012/0174157 A1 | 7/2012 | Stinson, III | |
| 2012/0192232 A1 | 7/2012 | Ellis | |
| 2012/0198492 A1 | 8/2012 | Dhruv et al. | |
| 2012/0272264 A1 | 10/2012 | Suzuki | |
| 2013/0170818 A1 | 7/2013 | Klappert | |
| 2013/0175333 A1* | 7/2013 | Gilbert | H04N 21/41407 235/375 |
| 2013/0198642 A1 | 8/2013 | Carney | |
| 2013/0305287 A1 | 11/2013 | Wong | |
| 2014/0150019 A1 | 5/2014 | Ma et al. | |
| 2014/0157312 A1 | 6/2014 | Williams | |
| 2014/0189743 A1 | 7/2014 | Kennedy | |
| 2014/0245351 A1 | 8/2014 | Ford | |
| 2014/0280883 A1 | 9/2014 | Pieczul et al. | |
| 2014/0351843 A1 | 11/2014 | Theriault | |
| 2014/0366068 A1 | 12/2014 | Burkitt | |
| 2014/0373041 A1* | 12/2014 | Yan | H04N 21/4627 725/27 |
| 2015/0382042 A1 | 12/2015 | Wagenaar | |
| 2017/0041372 A1 | 2/2017 | Hosur | |
| 2020/0084486 A1* | 3/2020 | Cho | H04N 21/2541 |

* cited by examiner

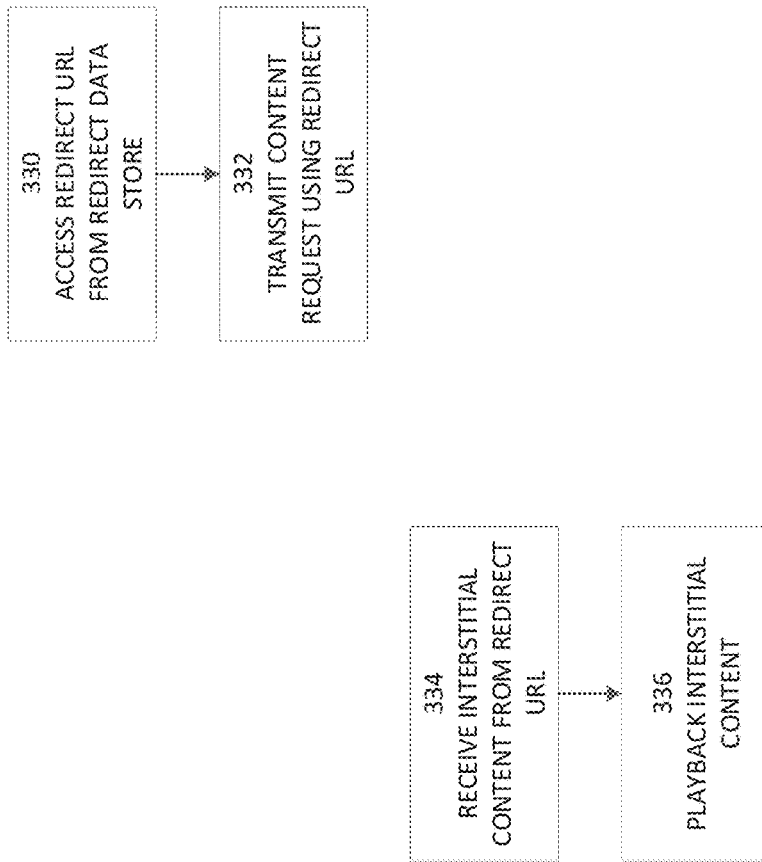

METHODS AND SYSTEMS FOR DYNAMIC ROUTING OF CONTENT USING A STATIC PLAYLIST MANIFEST

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to video players and in particular to routing video content to video players over a network.

Description of the Related Art

Items of video content from multiple sources may be routed over a network, such as the Internet, to a video player. For example, the video content may be routed using a video-on-demand system or on a scheduled basis. Disadvantageously, when a client pre-caches video content in accordance with a playlist manifest (e.g., an HLS playlist manifest), it is conventionally not feasible or possible to later replace the pre-cached video content with different content. Further, it is not conventionally possible to modify an HLS playlist manifest once the HLS playlist manifest is downloaded to the video player.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to systems and methods that enable video on demand playback startup times to be reduced. A redirect database is populated with redirect locators. A request from a device for an item of primary video content is received. A manifest file is generated including locators corresponding to the requested item of primary video content and redirect database entries storing redirect locators to default supplementary media. The manifest file is substantially immediately transmitted to the device. After the manifest file is transmitted to the device, potential items of supplementary media are identified by sources of supplementary media, and a first item of supplementary media is selected. A redirect locator in the redirect database is replaced with a redirect locator corresponding to the selected supplementary media. A request is received from the device directed to the redirect database location storing the redirect locator corresponding to the selected supplementary media. The selected supplementary media is enabled to be streamed to the device.

An aspect of the present disclosure relates to a redirect database populated with redirect locators. A request from a device for a first item of video content is received. A manifest file is generated including locators corresponding to the requested first item of video content and redirect database entries storing redirect locators to first media. The manifest file is substantially immediately transmitted to the device. After the manifest file is transmitted to the device, potential items of alternative media are identified by sources of supplementary media, and a first item of alternative media is selected. A redirect locator in the redirect database is replaced with a redirect locator corresponding to the selected alternative media. A request is received from the device directed to the redirect database location storing the redirect locator corresponding to the selected alternative media. The selected alternative media is enabled to be streamed to the device.

An aspect of the present disclosure relates to a system, comprising: a computer device; a network interface; a redirect data store; non-transitory computer readable memory having program instructions stored thereon that when executed by the computing device cause the system to perform operations comprising: populating, using a locator proxy service, the redirect data store with redirect locators corresponding to default interstitial media; receiving from a user device video player, using the network interface, a request for an item of video content; generating a manifest file, the manifest file comprising locators corresponding to: segments of the requested item of video content, redirect data store entries storing redirect locators to default interstitial media; transmitting, using the network interface, the manifest file to the user device; transmitting context data to potential sources of interstitial media, the context data comprising information regarding a user of the user device and/or information regarding the requested item of video content; receiving interstitial media proposals from at least a portion of the potential sources of interstitial media; selecting at least a first interstitial media from the received interstitial media proposals; replacing a redirect locator in the redirect data store with a redirect locator corresponding to the selected first interstitial media; receiving a request for interstitial media directed to the redirect database location storing the redirect locator corresponding to the selected first proposed interstitial media; at least partly in response to receiving the request for interstitial media directed to the redirect database location, the redirect database location storing the redirect locator corresponding to the selected first proposed interstitial media, enabling the first proposed interstitial media to be streamed to the user device.

An aspect of the present disclosure relates to a computer implemented method, the method comprising: populating a redirect data store with redirect locators corresponding to default supplementary media; receiving over a network at a first system comprising a computing device, from a remote user device video player, a request for an item of video content; generating, using the first system, a manifest file, the manifest file comprising locators corresponding to: segments of the requested item of video content, redirect data store entries storing redirect locators to default supplementary media; transmitting using the first system, over the network, the manifest file to the user device; after transmitting the manifest file to the user device, receiving supplementary media proposals from potential sources of supplementary media; selecting at least a first supplementary media from the received supplementary media proposals; populating the redirect data store with a redirect locator corresponding to the selected first supplementary media; receiving at the first system a request for supplementary media directed to the redirect database location storing the redirect locator corresponding to the selected first proposed supplementary media; at least partly in response to receiving the request for supplementary media directed to the redirect database location storing the redirect locator corresponding to the selected first proposed supplementary media, enabling the first proposed supplementary media to be streamed to the user device.

An aspect of the present disclosure relates to a non-transitory computer readable data media that stores computer executable instructions that when executed by a computing device, cause the computing device to perform operations comprising: populating a redirect data store with redirect locators corresponding to default supplementary media; receiving, from a user device video player, a request for an item of video content; generating a playlist manifest, the playlist manifest comprising locators corresponding to: segments of the requested item of video content, entries storing redirect locators to default supplementary media; transmitting the playlist manifest to the user device; receiving supplementary media proposals from one or more potential sources of supplementary media; selecting at least a first supplementary media from the received supplementary media proposals; populating the redirect data store with a redirect locator corresponding to the selected first supplementary media; receiving a request for supplementary media directed to the redirect database location storing the redirect locator corresponding to the selected first proposed supplementary media; at least partly in response to receiving the request for supplementary media directed to the redirect database location storing the redirect locator corresponding to the selected first proposed supplementary media, enabling the first proposed supplementary media to be streamed to the user device.

BRIEF DESCRIPTION OF THE DRAWINGS

FIGS. 3A-3C illustrate an example process.

Figure 1:
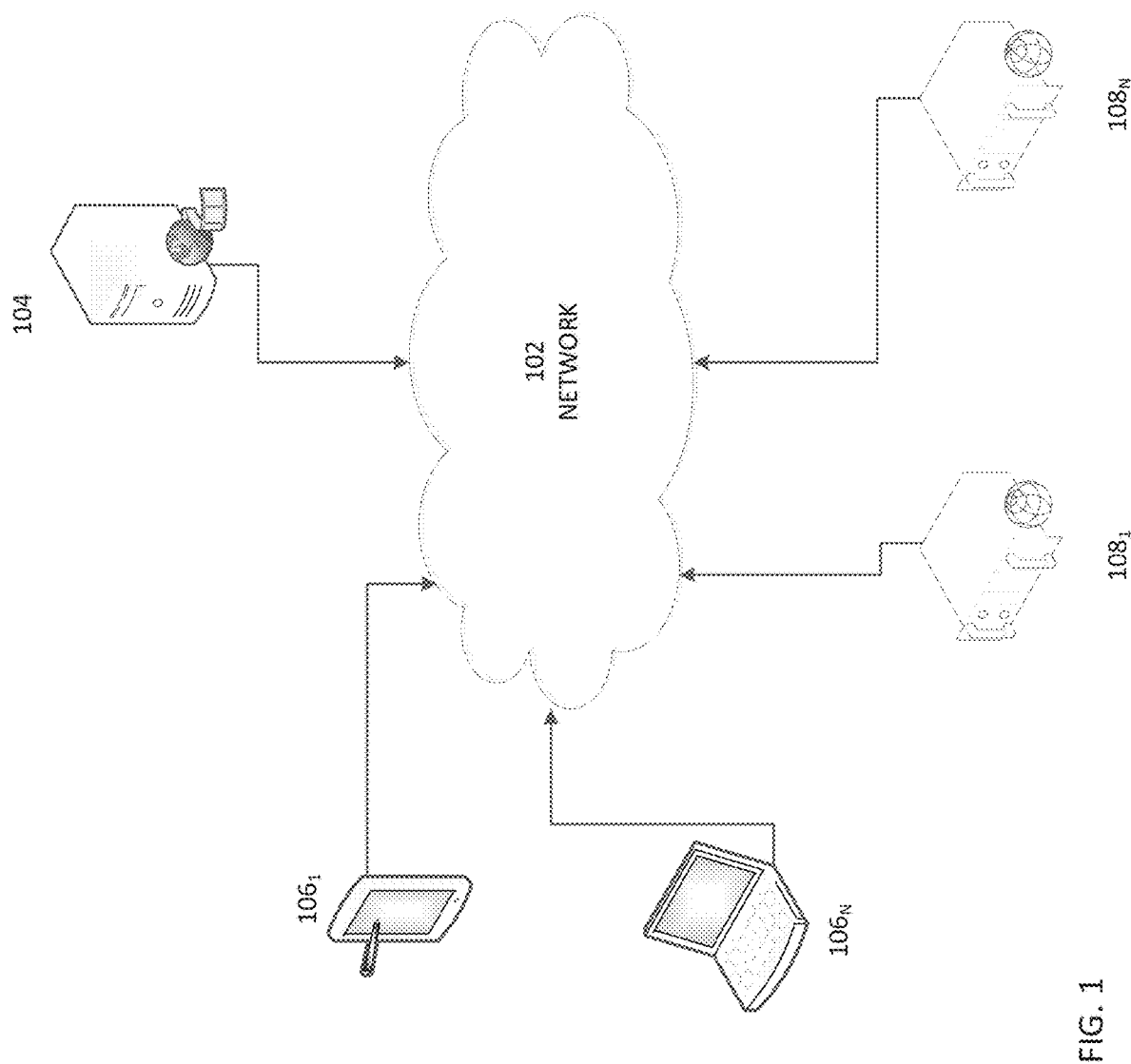
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described for dynamically selecting and routing content in response to requests made by a static playlist previously downloaded to and residing on a client device. Further, as will be described herein, technical solutions are described for speeding up the playback time of video-on-demand content by the client device.

By contrast, using conventional approaches, when a static playlist is downloaded to a client device, the client may pre-cache content corresponding to the content items identified in the static playlist. The pre-cached content conventionally cannot be dynamically replaced with different content. Further, once a static playlist is downloaded to a client device, the static playlist cannot be conventionally modified.

As will be described in greater detail herein, a client (e.g., a video player) executing on a user device may request a playlist (e.g., in response to a user requesting content, such as a video, via the client or in response to a scheduled request). By way of example, the playlist may be a live video-on-demand (VOD) HTTP Live Streaming (HLS) manifest, an MPEG DASH (Dynamic Adaptive Streaming over HTTP) manifest, or other playlist-type. A system (e.g., a server configured to service playlists) receives the playlist request and initiates the construction of a corresponding playlist to provide in a response to the request.

In generating the playlist for the response, the system may evaluate the primary content being requested and determine which (if any) ancillary pods, such as an interstitial pod (a time frame reserved for interstitials, wherein one or more interstitials may be needed to fill a pod) are to be included in the playlist (e.g., based on the primary content being requested, user information, time of day, a specification from an accessed file, and/or other information), and may determine the length of the interstitial pod to be inserted.

The system may lay out the content video segments in the playlist (e.g., an HLS or DASH manifest format). At locations where an interstitial pod is to be inserted, the interstitial pod may construct the pod using N-length (e.g., 2 seconds, 5 seconds, 10 seconds) segments based on fixed or dynamic data (e.g., statistical data reflecting the probability of the slot being a certain length, data from a data warehouse, etc.). Rather than including URLs that directly point to and access the interstitial content to be played by the user system client, proxy locators pointing to entries in a redirect database may be included. By way of illustrative example, the redirect database entries may include URLs to default content (such as default interstitials, such as quizzes, puzzles, public service announcements, advertisements, etc.).

In order to obtain the proxy locators, the system may optionally submit a request to a local or remote proxy service (e.g., a URL proxy service) for an interstitial pod for the determined interstitial pod length. The request to the proxy service may optionally be transmitted in parallel with laying out the content video segments. The proxy service may return, substantially immediately, a set of locators (e.g., network resource locators, such as Uniform Resource Locators (URLs)) that reference entries in the redirect database. The set of locators may accordingly be inserted at the appropriate points in the playlist.

Optionally, in addition, proxy beacon locators may be transmitted by the proxy service to the stitcher system. For example, beacons (e.g., ad beacons) may be in the form of HTTP GET requests sent to listed URLs based on certain ad events, such as when an ad video starts playing, or a current playback position. Rather than including the final URLs in the listed URLs, proxy URLs pointing to the redirect database may be included in the response. Optionally, a single proxy beacon URL may be used to access multiple beacons via the redirect database. The beacon URLs may be provided to the system and or to the user system client in parallel with the default interstitial default URLs via a sidecar application programming interface (API).

The system may then advantageously quickly return the playlist including the locators to the redirect database without having to wait for the system to determine if and what non-default interstitial content locators are to be included in the playlist. This approach enables the primary content (e.g., Video-on-Demand content) to be quickly accessed by the user system client, thereby greatly reducing video playback startup time.

After or while the system transmits the playlist to the user system, the proxy service may determine if and what non-default interstitial content is to be played by the user system client in place of the default content. For example, if the interstitial content is a video advertisement, the proxy server may request the advertisement from a third party ad supplier (e.g., an ad server) that conforms to the Video Ad Serving Template (VAST). VAST sets a standard for communication between ad servers and video players. The VAST ad server may respond to the ad request with a VAST data structure that declares the ad content that is to be played, how the content is to be played, and what is be tracked as the content is played by the video player. The proxy service may replace, as appropriate, the URLs to the default interstitial content in the redirect database with URLs to the determined non-default interstitial content (e.g., a video ad from the ad supplier system).

When the user system client (e.g., a video player, such as an HTML5 video player) receives the playlist with the proxy interstitial URLs and proxy beacon URLs, the receiving video player may access and play each item of content (including the primary content and the interstitial content) in the defined order, where the content is rendered on a display. In the case of the interstitial content, the client will request URLs pointing to redirect URL entries in the redirect database. The request will be redirected to the determined non-default interstitial content. Further, the system or client may similarly call the proxy beacon URLs, and the call may be redirected using the URLs to the non-default proxy beacon URLs that replaced the default beacon URLs in the redirect database.

Thus, the technical problem of slow video playback start-up of video-on-demand content is solved via the use of a redirect database. Another problem which may be solved using the disclosure herein is the problem of providing appropriate beacons while not slowing down the playback of video-on-demand content.

Optionally, the foregoing process may utilize an HTTP 301 redirect or an HTTP 302 redirect, which are configured to redirect a request to a given URL to a different URL. If an HTTP 301 redirect is used, optionally a response message may be transmitted back to the URL requester indicating that the requested resource (e.g., website or page) is being moved to a new/different URL permanently. If an HTTP 302 redirect is used, optionally a message may be transmitted back to the requester that the requested resource (e.g., website or page) is being moved to the new/different URL temporarily.

Optionally, rather than using an HTTP 301 redirect or an HTTP 302 redirect, a process of using a pass-through proxy of a content request may be utilized. As similarly discussed above, a manifest may be downloaded to a client (e.g., a video player) in response to a client content request. The manifest may include proxy interstitial URLs and proxy beacon URLs. The client may access and play each item of content (including primary content and interstitial content) in the order defined in the manifest, where the content is rendered on a display. In the case of the interstitial content, the client will request URLs pointing to redirect URL entries in the redirect database. The request will be redirected to the determined non-default interstitial content. Further, the system or client may similarly call the proxy beacon URLs, and the call may be redirected using the URLs to the non-default proxy beacon URLs that replaced the default beacon URLs in the redirect database. However, in this configuration, rather than cause the system (e.g., a content delivery network system (CDN) that includes geographically distributed network of proxy servers and data centers) to stream the content corresponding to the redirect URL entries in the redirect database directly to the client, the CDN will stream the content corresponding to the redirect URL entries to the system 104 (or other system forwarding the request to the CDN), which in turn will stream the content to the client directly in the HTTP response. Thus, the system 104 (or other server system) receives an HTTP request from a client, redirects the request to a proxy URL, receives the redirect URL data (e.g., interstitial content), and transmits the response to the request, including the redirect URL data, to the requesting client.

Certain example aspects will now be discussed with reference to the figures. It should be noted that while reference may be made to certain protocols and formats for illustrative example, other standard and/or non-standard protocols and formats may be used.

FIG. 1 illustrates an example environment. A system 104, sometimes referred to herein as a stitcher system, is connected to a wired and/or wireless network 102 (e.g., the Internet, a dedicated intranet, and/or the like) via a network interface. As will be described in greater detail herein, the stitcher system 104 may assemble a playlist (e.g., a manifest file, such as an HLS or DASH manifest file) that defines a linear sequence of content, such as individual clips, interstitials, and/or other content. The playlist effectively "stitches" the variety of media items into a continuous video stream during playback which may be rendered on a display.

Thus, a stitching service provided by the system 104 may be utilized which stitches various items of video content to define a stream of content. The stitched video content may include primary content (e.g., a program, a movie, or the like) and supplemental content (e.g., interstitial content, such as an advertisement, public service announcement, quiz, program information, etc.). If content items/segments identified in the playlist manifest are encrypted, the manifest may include corresponding locators (e.g., URLs) to decryption keys. The decryption keys may be accordingly be requested by a client (e.g., a video player) and used to decrypt the corresponding content items/segments.

If the HLS protocol is being used, the system 104 may make the stream available to clients, such as video players (e.g., hosted on remote user devices) through a URL that returns an HLS .m3u8 file. As described herein, the HLS .m3u8 file may include proxy URLs for certain content. The receiving video player may access and play each item of content in the defined order (where the proxy URLs are used to make requests via a proxy database). As noted above, while certain examples will be described with respect to the HLS protocol, other protocols, such as by way of example the MPEG DASH protocol, may be used. MPEG DASH (Dynamic Adaptive Streaming over HTTP) is a standard for adaptive streaming over HTTP. Similar to the HLS protocol, the MPEG DASH protocol generates and provides manifest files that identify the streams for the player and contain their respective URL addresses. Other protocols that may be used include Real-Time Messaging Protocol (RTMP), HTTP Dynamic Streaming (HDS), Microsoft Smooth Streaming (MSS), etc.

By way of example, if the primary video content (e.g., a movie, episode, or the like) is being streamed for playback as video-on-demand (VOD) content, the system 104 may include indicators in the manifest file (e.g., an HLS or DASH manifest file) indicating where respective items of interstitial content are to be played. The entire manifest file, including indications of interstitial locations, may be transmitted over the network 102 to a video player hosted on a user device 106 at the beginning of the streaming of the video content. Thus, for VOD sessions, the client video player is provided full access to the entire program with a single manifest file. However, because the single manifest file identifies all the primary content segments and interstitial locations and is static, conventionally the interstitials must be known at the time the manifest file is generated and downloaded to the client.

In particular, disadvantageously using conventional approaches, prior to generating the manifest file and transmitting the manifest file to the video player, the stitcher system 104 would need to know the URLs for the interstitial content (or other supplementary content) that are to be actually played by the user device video player. Because the process for obtaining the URLs for the interstitial content may take time (as the process may involve communications between multiple systems, where each system may need to perform multiple operations so that the URLs for the interstitial content may be determined), playback of video-on-demand content by the client video player may be delayed. Further, once the manifest file is downloaded to the user device 106, the manifest file cannot be dynamically modified.

As described in greater detail herein, in contrast to conventional techniques, a proxy service may be used to insert proxy locators (e.g., URLs) for some or all of the content (e.g., interstitial or other supplemental content) included in the manifest file to advantageously enable the manifest file to be much more quickly generated and provided to the client video player, thereby enabling video playback by the video player to be more quickly initiated. Similarly, the proxy service may be configured to provide proxy locators for beacons, where a given proxy locator may be used to access one or multiple beacon URLs. The beacon URLs may be used to issue corresponding HTTP GET requests. An HTTP GET request may not require a response, and may be used for logging activity and sending analytics data to a server. For example, the HTTP GET request may be used to for activity logging, tracking playback of interstitial content, tracking user interaction with content, for diagnostic purposes, and/or the like.

The example stitcher system 104 is configured to communicate with client devices 106₁ . . . 106ₙ that comprise video players (e.g., HTML5 video players). By way of example, the video player may be embedded in a webpage, may be a dedicated video player application, or may be part of a larger application, sometimes referred to as an "app" (e.g., a game application, a word processing application, etc.).

The stitcher system 104 may receive a request for media from a given client device 106 in the form of a request for a playlist manifest. The stitcher system 104 may identify (e.g., based on the primary content being requested, user information, time of day, a specification from an accessed file, and/or other information) the location within the primary content and length of an interstitial pod (a time frame reserved for interstitials, wherein one or more interstitials may be needed to fill a pod). The stitcher system 104 may determine context information (e.g., information regarding the primary content being requested, information regarding the user, and/or other context information), solicit and select interstitial content from third parties (directly or via a local or remote service), encrypt content, generate playlist manifests, provide decryption keys, determine video player play position, process playback information, and/or perform other functions described herein. The stitcher system 104 and/or another system may stream requested content to the requesting device 106.

Optionally, in order to select certain content (e.g., supplementary content, such as interstitial content) the stitcher system 104 may transmit context information to one or more interstitial source systems 108₁ . . . 108ₙ. The context information may be transmitted before, after, or in parallel to the transmission of the playlist manifest with proxy URLs (pointing to corresponding entries in a redirect database) to the client device 106 that requested the playlist manifest.

For example, the source systems 108₁ . . . 108ₙ may optionally include ad servers, and the supplementary content may comprise ads (video, audio, graphic, and/or text ads). The source systems 108₁ . . . 108ₙ may comply with the VAST protocol. By way of further example, the source systems 108₁ . . . 108ₙ may provide public service videos, previews of upcoming programs, quizzes, news, games, and/or other content. The source systems 108₁ . . . 108ₙ may use the context information in determining what interstitial content is to be provided or offered to the requesting client device 106. Optionally, the source systems 108₁ . . . 108ₙ may submit bids to place interstitial content in association with primary content, and the stitcher system 104 may evaluate the bids and optionally based at least in part on the bids, select one or more items to insert into an interstitial pod. URLs corresponding to the selected items may be inserted into the redirect database "just in time" so that the client device's requests will be redirected to the corresponding selected items at the appropriate time.

As discussed above, optionally, the HLS communications protocol may be utilized for streaming video content. Examples of browsers that include an HLS video player include, without limitation, the Safari web browser, the Chrome browser with an HLS plugin, the Microsoft Edge browser, and the like. HLS employs the MPEG-2 Transport Stream (MP2TS). As similarly, discussed elsewhere, other protocols such as by way of example the MPEG DASH protocol, may be used. MPEG DASH (Dynamic Adaptive Streaming over HTTP) is a standard for adaptive streaming over HTTP. Similar to the HLS protocol, the MPEG DASH protocol generates and provides manifest files that identify the streams for the player and contain their respective URL addresses (e.g., absolute or relative). Still other protocols that may be used (e.g., DASH, RTMP, HDS, MSS).

With respect to the HLS protocol, the HLS protocol breaks a video overall stream into a sequence of relatively small HTTP-based file downloads (e.g., .ts files that include 5 seconds, 10 seconds, or other length of video content). At the start of the streaming session, an extended M3U8 playlist manifest is downloaded to the video player. The playlist manifest contains respective metadata for the various substreams. However, an HLS playlist manifest file comprises a simple, static list of video files to be played in sequence. The playlist manifest file cannot conventionally be dynamically modified by a remote system once downloaded to a client device. However, using methods and systems disclosed herein, the inability to modify the static playlist manifest file is overcome via the use of proxy URLs and a redirect database, where redirect database entries may be dynamically modified after the playlist manifest file is downloaded to the video player, to thereby functionally accomplish the goal of having a dynamically available playlist manifest file.

As noted above, the source systems 108₁ . . . 108ₙ may comply with the VAST protocol. Optionally, if the interstitial content is a video advertisement, the advertisement may be provided from a third party ad supplier that conforms to the VAST standard. Conventionally, in order to play a video ad in a video player, the video player itself sends a request to a VAST ad server. The request may be a simple HTTP based URL request. However, rather than the video player sending the request to the VAST ad server, advantageously the video player request is received at the redirection database, the corresponding redirect URL is located, and the request is transmitted by a proxy service to the VAST ad server. The VAST ad server responds to the ad request with a VAST data structure transmitted to the video player that declares the ad content that is to be played, how the content is to be played, and what is be tracked as the content is played by the video player.

Thus, for example, ad content playback may be monitored and verified using ad beacons in the form of HTTP GET requests sent to listed URLs based on certain ad events, such as when an ad video starts playing, when 25% of the video has been played backed, when 50% of the video has been played backed, when 75% of the video has been played backed, and when 100% of the video has been played backed. When the HTTP GET request is made, the receiving server notes that the request has been received and can therefore measure the viewing of an ad video and the source of the interstitial (e.g., an ad) be charged accordingly.

Server-Side Beaconing Ad Insertion (SSBAI) may optionally be utilized, enabling an HLS player to make a direct HTTP request to trigger the proxy service (e.g., the Ad Impression Proxy service) and subsequent beacon calls at the point in time of the TS request. The subsequent beacon calls may optionally be made to one or more Dynamic Ad Insertion (DAI) systems, where an ad manager optionally tracks and reports on video stream metrics. The stitcher system 104 or the client 106 may call the redirect Beacon URL for triggering one or more corresponding beacons. Advantageously, the use of optional use of SSBAI enables buffer-less transition from primary content, to the ad, then back to primary content.

As discussed elsewhere herein, optionally an HTTP 301 redirect or an HTTP 302 redirect may be used in performing the redirection process in response to a client content request. Optionally, instead, a pass-through proxy may be utilized, wherein a redirect URL may be utilized as similarly discussed above, and the process receives the redirect URL data (e.g., using the system that forwarded the client request to a CDN storing requested content, such as stitcher system 104) and transmits the redirect URL data directly in the HTTP response to the client (e.g., browser, dedicated video player, dedicated app having a video player, etc.).

Figure 2A:
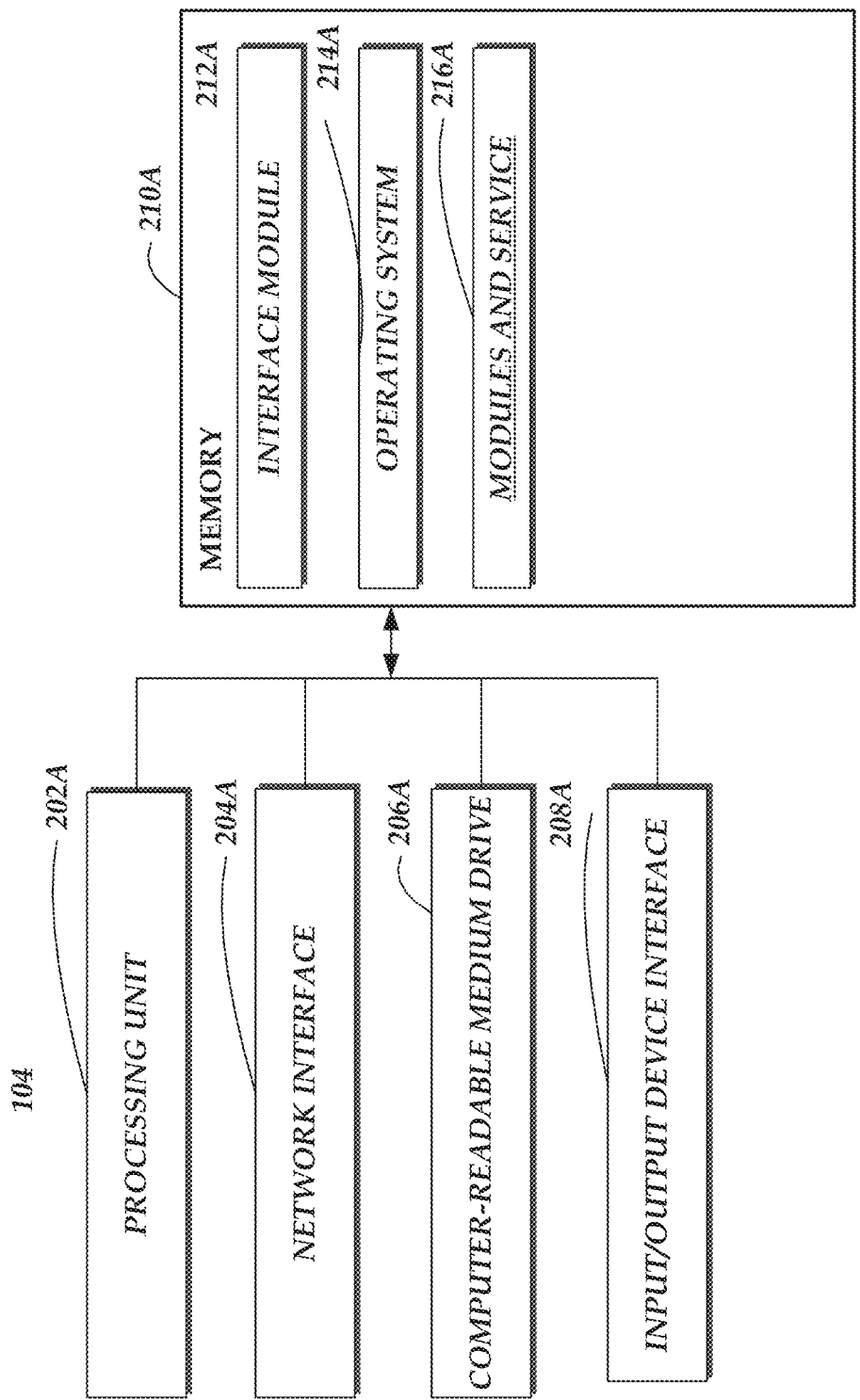
FIG. 2A is a block diagram illustrating example components.

FIG. 2A is a block diagram illustrating example components of an example stitcher system 104. The stitcher system 104 includes an arrangement of computer hardware and software components that may be used to implement aspects of the present disclosure. Those skilled in the art will appreciate that the example components may include more (or fewer) components than those depicted in FIG. 2A.

The stitcher system 104 may include one or more processing units 202A (e.g., a general purpose processor, an encryption processor, a video transcoder, and/or a high speed graphics processor, where the processing units may be co-located or distributed in a cloud system), one or more network interfaces 204A, a non-transitory computer-readable medium data store drive 206A (e.g., that stores one or more databases), and an input/output device interface 208A, all of which may communicate with one another by way of one or more communication buses or networks. The network interface 204A may provide the various services described herein with connectivity to one or more networks or computing systems. The processing unit 202A may thus receive information and instructions from other computing devices, systems, or services via a network. The processing unit 202A may also communicate to and from memory 206A and further provide output information via the input/output device interface 208A. The input/output device interface 208A may also accept input from various input devices, such as a keyboard, mouse, digital pen, touch screen, microphone, camera, etc.

The drive 206A may store a redirect database that stores entries comprising redirect URLs to selected content and beacon redirect URLs, as described elsewhere herein.

The memory 210A may contain computer program instructions that the processing unit 202A may execute in order to implement one or more embodiments of the present disclosure. The memory 202A generally includes RAM, ROM and/or other persistent or non-transitory computer-readable storage media. The memory 202A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces (e.g., APIs) through which a compatible computing device, may send to, or receive from, the modules and services 216A.

Figure 2B:
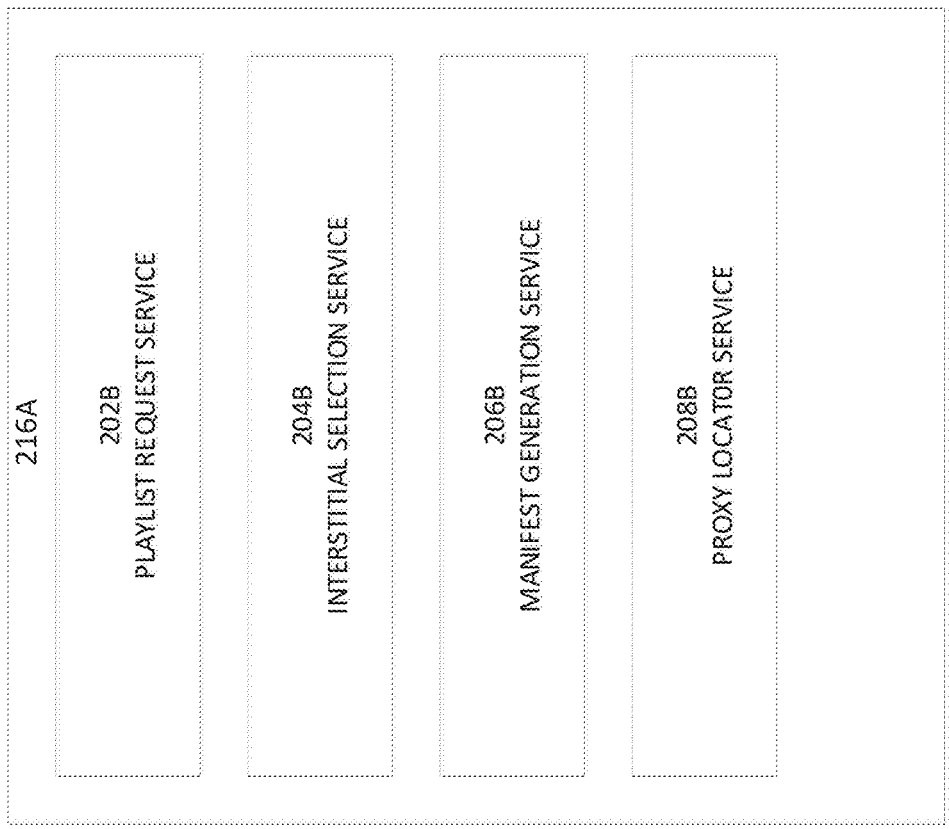
FIG. 2B illustrates example modules and services.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload compute-intensive portions of the modules and services 216A to a dedicated video codec, while other code may run on a general purpose processor. The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Optionally, the stitcher system 104 may comprise a hosted computing environment that includes a collection of physical computing resources that may be remotely accessible and may be rapidly provisioned as needed (sometimes referred to as a "cloud" computing environment). The data store 206A and/or memory 210A are optionally a hosted storage environment that includes a collection of physical data storage devices that may be remotely accessible and may be rapidly provisioned as needed (sometimes referred to as "cloud" storage).

Referring FIG. 2B the modules and services 216A may include modules that provide a playlist request service 202B, an interstitial selection service 204B, a playlist manifest generation service 206B, and a proxy locator service 208B.

The playlist request service 202B may receive and process requests for playlist manifests from user device clients (e.g., video players). The interstitial selection service 204B may assemble content information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source systems (e.g., interstitial source systems $108_1 \ldots 108_n$). The interstitial source systems may propose interstitial content to the interstitial selection service 204B of the stitcher system. The interstitial selection service 204B may evaluate the proposals (e.g., based on interstitial content subject, the proposal source, associated bid amounts, etc.) and select one or more items of interstitial content for inclusion in the interstitial pod.

The manifest generation service 206B may be used to assemble a playlist manifest (e.g., an HLS or MPEG DASH manifest) including locators (e.g., URLs) pointing to segments of primary and interstitial content and locators (e.g., URLs). For certain content (e.g., ads or other content that needs to be identified in real time while primary content is being played back by the user device), the manifest generation service 206B may insert URLs to redirect database entries into the playlist manifest, where the redirect database entries include locators to default content (e.g., default interstitials, such as quizzes, puzzles, public service announcements, advertisements, etc.).

The proxy locator service 208B may replace some or all of the redirect URLs to default content in the redirect database with redirect URLs to content selected by the interstitial selection service 204B. If the interstitial selection service 204B has not selected content from the proposed content for inclusion in a given position in the interstitial pod, the corresponding redirect URL in the redirect database to the default content may be left unaltered, and accordingly accessed and played back by the user device video player.

Figure 3A:
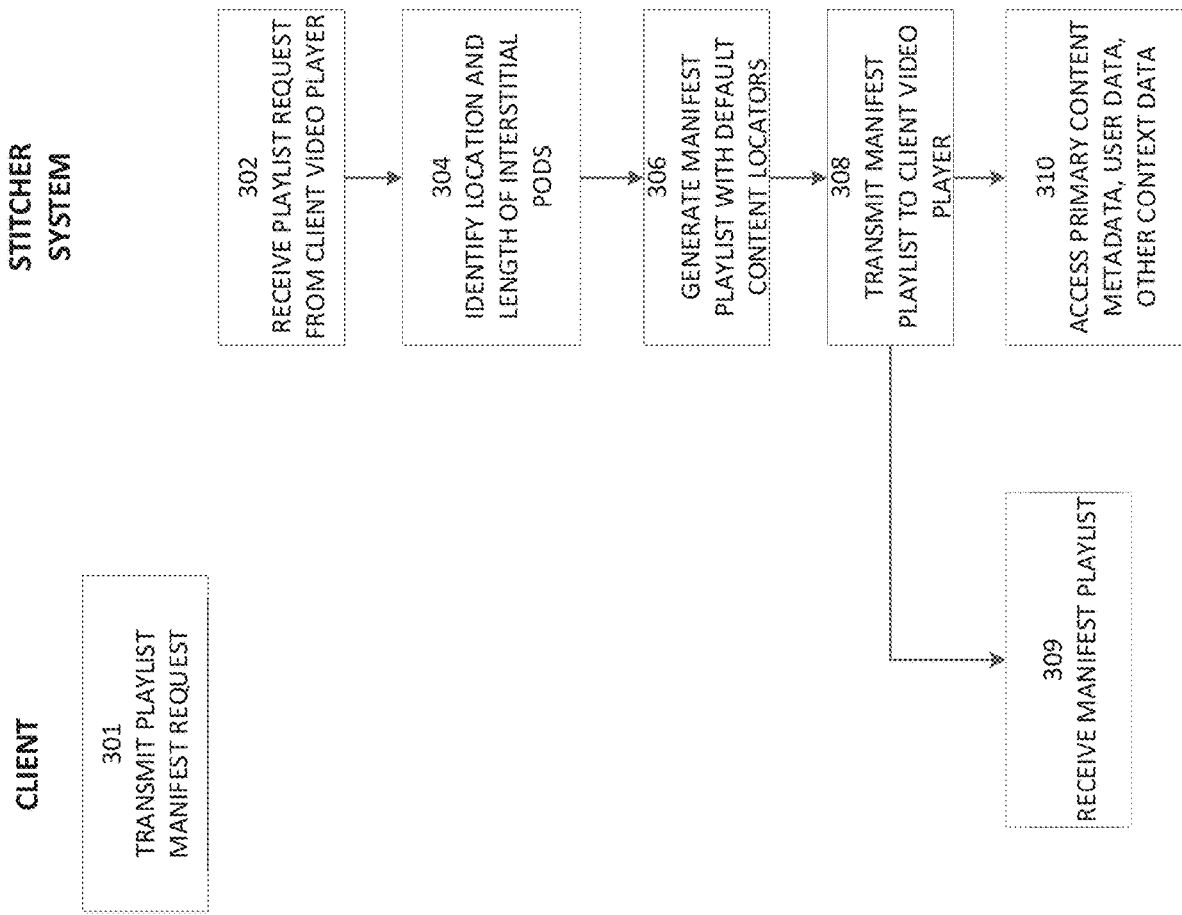
Figure 3B:
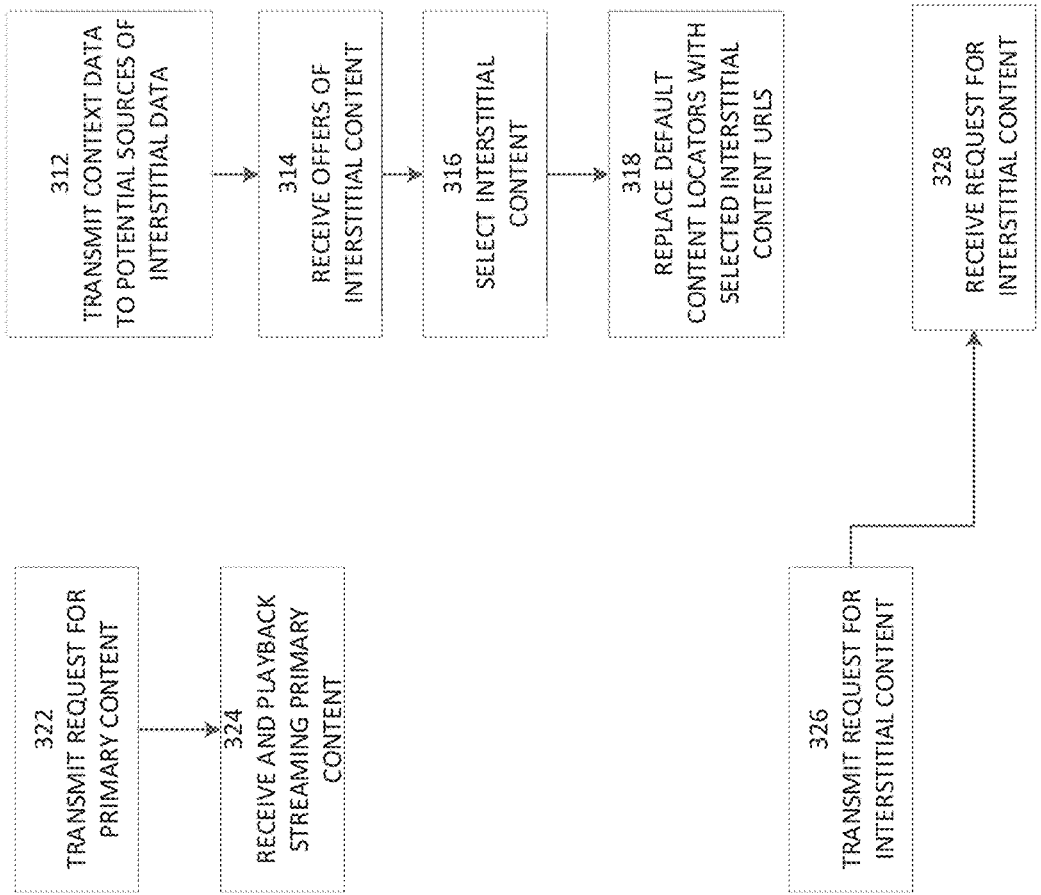

FIGS. 3A, 3B, 3C illustrate an example process. The process may optionally be implemented using the example stitcher system and an example client device described elsewhere herein. At block 301, a user device client (e.g., a video player) transmits a request for content in the form of a request for a playlist manifest (e.g., a static HLS .m3u8 or an MPEG DASH .mpd manifest file). The request may be for an item of primary content, such as a movie or episode. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or other control, or the request may have been automatically issued by an application or webpage executing on the user device. For example, if the user has completed playing a first movie (or other content, such as a program episode), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/635,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a playlist manifest for the next scheduled movie (or other item of content).

The next scheduled movie may be scheduled in accordance with a program guide, where the program guide may include multiple channels (e.g., corresponding to different subject matters), where a given channel has associated programs (e.g., movies or other items of content) with scheduled start and end times. Thus, for example, a playlist manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time), the corresponding playlist manifest may be automatically requested and provided to the stitcher system.

At block 302, the request from the video player on the user device for a playlist manifest is received over a network by a stitcher system (e.g., a wired or wireless network).

At block 304, the location and length of interstitial pods within the requested primary content are identified. For example, the process may access a file or other metadata associated with the primary content that indicates the positions within the primary content for interstitial pods, wherein a given interstitial pod may have a specified length (e.g., 15 seconds, 30 seconds, 1 minute, 2 minutes, or other length). At block 306, the stitcher system constructs the requested playlist manifest, with locators (e.g., URLs) for the primary content and locators of entries in a redirect database for certain other content (interstitials), where the redirect database entries are populated with redirect URLs of default content (default interstitial content, such as quizzes, puzzles, public service announcements, advertisements, etc.). The redirect URLs may be accessed from a proxy service. Optionally, in addition, beacon locators (e.g., URLs) may be received from the proxy service that reference the redirect database.

For example, the manifest file may be an HLS .m3u8 or an MPEG DASH .mpd static manifest file. The format of the static manifest file may cause the manifest file not be alterable by the stitcher system after it is transmitted to the user system. The manifest file may include locators (URLs) for each primary content and interstitial segments or pods in the desired playback order. Certain locators (e.g., URLs), such as locators for interstitial content, may be for redirect entries in the redirect database (which in turn have locators for corresponding default content). The manifest file may include the entire playlist for the requested content. The manifest file may include, in the appropriate sequence location, decryption key locators (e.g., URLs), which may be identified using tags, and an encryption type may be identified. For example, an EXT-X-KEY tag may optionally be used to identify encrypted content.

An example static playlist manifest is as follows:

EXTM3U (which is a format descriptor indicating that the playlist, in this example, is an extended M3U file)

EXT-X-PLAYLIST-TYPE:VOD (indicates that the playlist type is video-on-demand)

EXT-X-TARGETDURATION:5 (maximum media file duration)

EXT-X-VERSION:4 (protocol compatibility version of the playlist file)

EXT-X-MEDIA-SEQUENCE:0 sequence number of the first URL that appears in a playlist file)

EXTINF:5.0, (record marker describing media file identified by the following URL and duration of media segment in seconds)

http://pluto.com/primarycontentA/Sequence1.ts (URL to primary content segment)

EXTINF:10.0, http://pluto.com/movie1/Sequence2.ts
EXTINF:5.0,
http://pluto.com/interstitialpod/redirect1.ts (URL to redirect database entry for interstitial content)
EXTINF:5.0,
http://pluto.com/movie1/Sequence3.ts
EXTINF:10.0,
http://pluto.com/movie1/Sequence4.ts
EXTINF:5.0,
http://pluto.com/interstitialpod/redirect2.ts
EXT-X-ENDLIST The above example utilizes full, absolute URL pathnames for content file playlist entries. Optionally instead, relative pathnames may be utilized, where the relative pathnames are relative to the playlist file URL. For example, "http://pluto.com/interstitialpod/redirect1.ts" may be expressed as "redirect.ts."

At block 308, the playlist manifest, including locators of redirect entries in the redirect database, is transmitted by the stitcher system to the video player on the user device. At block 309, the video player on the user device receives the playlist manifest (and the beacon URLs that are directed to corresponding entries in the redirect database, such as via a sidecar API).

At block 322, the video player on the user device begins requesting content in the order defined by the playlist manifest. For example, if the initial entry in the playlist manifest is a URL for a segment of primary content, then the user device video player will access, using the primary content segment URL, the primary content segment from the primary content source. If the requested content is encrypted, the user device video player may request a decryption key (e.g., via a decryption key URL included in the playlist manifest).

At block 324, the user video player receives and playbacks the streaming primary content segment, which is rendered on a display. If the primary content is encrypted, the video player may receive and use the decryption key to decrypt the primary content segment. Optionally, the content source may make a determination as to whether the primary content has already been segmented in a form compatible with the requested user device. Different transcoding may need to be performed for different user devices and different user device display sizes (e.g., 10.1 inch tablet display, 5.4 inch phone display, etc.). Thus, the content source may perform content segmentation and/or transcoding based on the user device, or provide previously segmented or transcoded content suitable for the user device.

Blocks 322 and 324 may be repeated for multiple primary content segments in the playlist manifest.

If the first content item in the playlist is for interstitial content, then at block 322 the corresponding URL, which points to an entry in the redirect database, may be accessed by the user device video player, which in turn will cause the corresponding default content to be streamed to the user device video player if the redirect URL for the default content was not replaced with a different redirect URL.

At block 310 (optionally in parallel with the generation or transmission of the playlist manifest at block 306, the transmission of the playlist manifest to the user device video player at block 308, the user device video player content request transmission at block 322, and/or the playback of the requested content at block 324), context information, such as user and/or primary content information, that may be used in selecting interstitial content for interstitial pods, may be determined or collected by the stitcher system.

For example, the process may optionally access (e.g., from a user profile data record) or determine user information, such as, by way of example, user demographics (e.g., age, gender, geographical location, income, number of household members, languages spoken), user purchase history, user navigation and viewing history, expressed user preferences, inferred user preferences, historical interstitial interactions information, user device model, user device type (e.g., phone, tablet, laptop, desktop computer, television streaming media player, etc.), user browser, and/or the like. The process may optionally determine a user's social networking contacts and access or determine some or all of the same information for one or more of such contacts. The process may optionally access (e.g., from associated metadata) or determine information regarding the primary content the user is requesting, such as title, category, genre, rating, products or services depicted in the primary content (and optionally at what point in time or what frames those products or services depicted), and/or the like.

At block 312, some or all of the context information is optionally transmitted by the stitcher system to one or more potential sources for interstitial content (e.g., one or more remote systems). Optionally, a desired length for the interstitial content is also transmitted to the potential sources for interstitial content. Optionally, a separate message transmission is made for each interstitial pod. Optionally, a complete listing of all the interstitial pods and associated information are included in the same message.

The desired length may be the time length of the entire interstitial pod (e.g., 60 seconds) or a shorter length (e.g., 30 seconds, where two 30 second interstitials may be used to fill a given interstitial pod).

Optionally, the potential sources for interstitial content may use the context information in determining whether to offer interstitial content and which interstitial content to offer. For example, if a potential source for interstitial content is an ad server, the ad server may determine whether the context information matches any ad specifications, and if so, the ad server may optionally determine a bid for placement of the interstitial content.

At block 314, offers of interstitial content are received by the stitcher system. The offers may include the interstitial content and/or metadata describing the interstitial content (e.g., the genre, subject matter, length, URL, etc.). The offers may optionally include bids (e.g., of a specified amount) for placement of the interstitial content. At block 316, the offers of interstitial content are evaluated (e.g., based on the content metadata, the source of the content, and/or bid amount), and interstitial content from among the offers is selected for the interstitial pods.

At block 318, the stitcher system may use the locator (e.g., URL) for the selected interstitial content to replace a corresponding redirect locator in the redirect database. In addition, beacon URLs associated with the selected interstitial content may be used to populate corresponding redirect entries in the redirect database.

At block 326, the user device video player requests interstitial content using a locator in the playlist manifest that corresponds to an entry in the redirect database. The user device video player may also request beacon URLs corresponding to beacon entries in the redirect database at the appropriate times.

At block 328, the request is received at the redirect database. At block 330, the redirect database accesses the corresponding redirect locator (URL) corresponding to the request. At block 332, the redirect locator is used to request that the corresponding interstitial content be streamed to the user device video player (e.g., where the request is provided to a system, such as a content delivery network system, which may correspond to an interstitial source system 108, storing the interstitial content). For example, optionally an HTTP 301 or HTTP 302 redirect may be used. At block 334, the user device video player may receive the interstitial content corresponding to the redirect locator (e.g., from the content delivery network system). If interstitial content is encrypted, the user device video player may request a decryption key and decrypt the interstitial content. At block 336, the user device video player plays back and renders on a display the interstitial content corresponding to the redirect locator. Optionally, server-side content (e.g., ad) insertion (SSAI) may be invoked to trigger the proxy service and subsequent beacon calls.

Figure 4A:
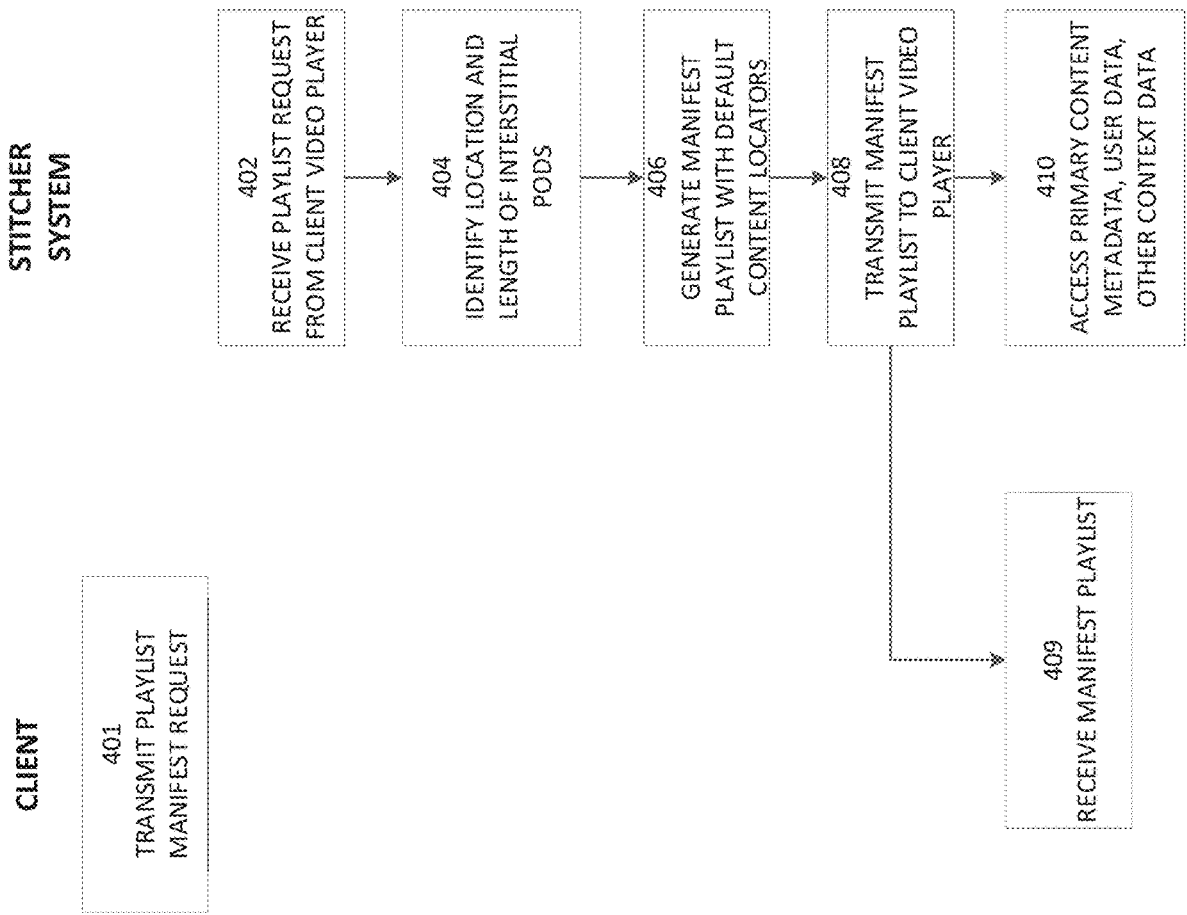
FIGS. 4A-4C illustrate another example process.
Figure 4B:
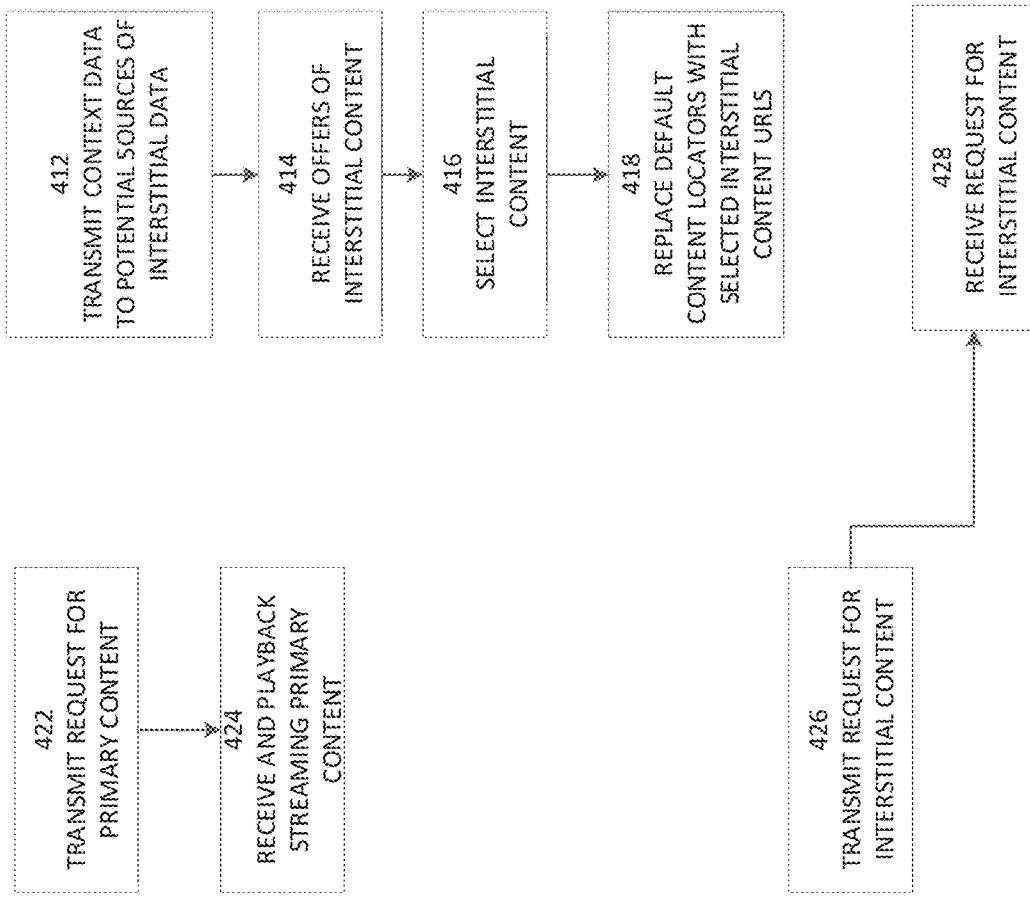
Figure 4C:
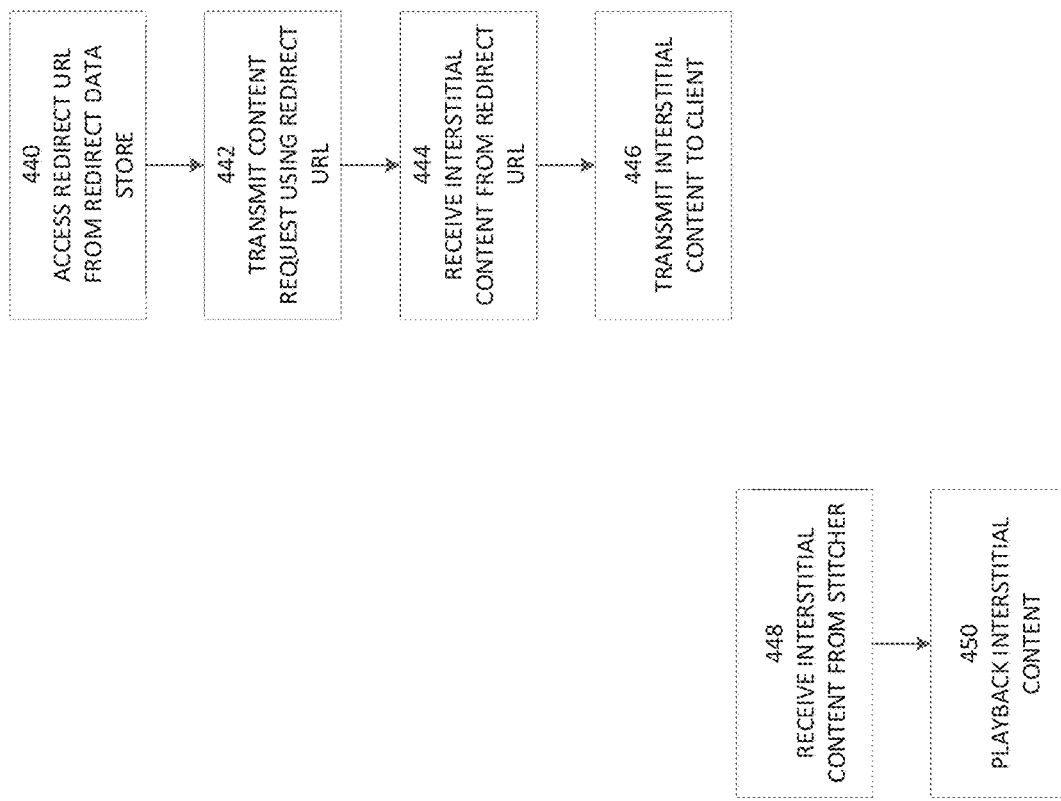

FIGS. 4A, 4B, 4C illustrate an example process that utilizes proxy pass-through technology. As discussed above with respect to FIGS. 3A, 3B, 3C the process may optionally be implemented using the example stitcher system and an example client device described elsewhere herein (although other systems may be used in addition or instead). At block 401, a user device client (e.g., a video player) transmits a request for content in the form of a request for a playlist manifest (e.g., a static HLS .m4u8 or an MPEG DASH .mpd manifest file). The request may be for an item of primary content, such as a movie or an episode of a series. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or other control, or the request may have been automatically issued by an application or webpage executing on the user device, as discussed elsewhere herein. For example, if the user has completed playing a first movie (or other content, such as an episode of a series), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/645,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a playlist manifest for the next scheduled movie (or other item of content, such as an episode of a series).

Optionally, the next scheduled movie or episode may be scheduled in accordance with a program guide, where the program guide may include multiple channels (e.g., corresponding to different subject matters), where a given channel has associated programs (e.g., movies or other items of content) with scheduled start and end times. Thus, for example, a playlist manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time), the corresponding playlist manifest may be automatically requested and provided to the stitcher system.

At block 402, the request from the video player on the user device for a playlist manifest is received over a network (e.g., a wired or wireless network) by a stitcher or other system.

At block 404, the location and length of interstitial pods within the requested primary content are identified. For example, the process may access a file or other metadata associated with the primary content that indicates the positions within the primary content for interstitial pods, wherein a given interstitial pod may have a specified length (e.g., 15 seconds, 40 seconds, 1 minute, 2 minutes, or other length). At block 406, the stitcher system constructs the requested playlist manifest, with locators (e.g., URLs) for the primary content and locators of entries in a redirect database for certain other content (interstitials), where the redirect database entries are populated with redirect URLs of default content (default interstitial content, such as quizzes, puzzles, public service announcements, advertisements, etc.). The redirect URLs may be accessed from a proxy service. Optionally, in addition, beacon locators (e.g., URLs) may be received from the proxy service that reference the redirect database.

For example, as similarly discussed above, the manifest file may be an HLS .m4u8 or an MPEG DASH .mpd static manifest file. The format of the static manifest file may cause the manifest file not be alterable by the stitcher system after it is transmitted to the user system. The manifest file may include locators (URLs) for each primary content and interstitial segments or pods in the desired playback order. Certain locators (e.g., URLs), such as locators for interstitial content, may be for redirect entries in the redirect database (which in turn have locators for corresponding default content). The manifest file may include the entire playlist for the requested content. The manifest file may include, in the appropriate sequence location, decryption key locators (e.g., URLs), which may be identified using tags, and an encryption type may be identified. For example, an EXT-X-KEY tag may optionally be used to identify encrypted content. An example of a static playlist manifest is discussed elsewhere herein. As discussed elsewhere herein, the manifest may use full, absolute URL pathnames for content file playlist entries, or relative pathnames may be utilized, where the relative pathnames may be relative to the playlist file URL.

At block 408, the playlist manifest, including locators of redirect entries in the redirect database, is transmitted by the stitcher system to the video player on the user device. At block 409, the video player on the user device receives the playlist manifest (and the beacon URLs that are directed to corresponding entries in the redirect database, such as via a sidecar API).

At block 422, the video player on the user device begins requesting content in the order defined by the playlist manifest. For example, if the initial entry in the playlist manifest is a URL for a segment of primary content, then the user device video player will access, using the primary content segment URL, the primary content segment from the primary content source. If the requested content is encrypted, the user device video player may request a decryption key (e.g., via a decryption key URL included in the playlist manifest).

At block 424, the user video player receives and playbacks the streaming primary content segment, which is rendered on a display. If the primary content is encrypted, the video player may receive and use the decryption key to decrypt the primary content segment. Optionally, the content source may make a determination as to whether the primary content has already been segmented in a form compatible with the requested user device. Different transcoding may need to be performed for different user devices and different user device display sizes (e.g., 10.1 inch tablet display, 5.4 inch phone display, etc.). Thus, the content source may perform content segmentation and/or transcoding based on the user device, or provide previously segmented or transcoded content suitable for the user device.

Blocks 422 and 424 may be repeated for multiple primary content segments in the playlist manifest.

If the first content item in the playlist is for interstitial content, then at block 422 the corresponding URL, which points to an entry in the redirect database, may be accessed by the user device video player, which in turn will cause the corresponding default content to be streamed to the user device video player if the redirect URL for the default content was not replaced with a different redirect URL.

At block 410 (optionally in parallel with the generation or transmission of the playlist manifest at block 406, the transmission of the playlist manifest to the user device video player at block 408, the user device video player content request transmission at block 422, and/or the playback of the requested content at block 424), context information, such as user and/or primary content information, that may be used in selecting interstitial content for interstitial pods, may be determined or collected by the stitcher system.

For example, the process may optionally access (e.g., from a user profile data record) or determine user information, such as, by way of example, user demographics (e.g., age, gender, geographical location, income, number of household members, languages spoken), user purchase history, user navigation and viewing history, expressed user preferences, inferred user preferences, historical interstitial interactions information, user device model, user device type (e.g., phone, tablet, laptop, desktop computer, television streaming media player, etc.), user browser, and/or the like. The process may optionally determine a user's social networking contacts and access or determine some or all of the same information for one or more of such contacts. The process may optionally access (e.g., from associated metadata) or determine information regarding the primary content the user is requesting, such as title, category, genre, rating, products or services depicted in the primary content (and optionally at what point in time or what frames those products or services depicted), and/or the like.

At block 412, some or all of the context information is optionally transmitted by the stitcher system to one or more potential sources for interstitial content (e.g., one or more remote systems). Optionally, a desired length for the interstitial content is also transmitted to the potential sources for interstitial content. Optionally, a separate message transmission is made for each interstitial pod. Optionally, a complete listing of all the interstitial pods and associated information are included in the same message.

The desired length may be the time length of the entire interstitial pod (e.g., 60 seconds) or a shorter length (e.g., 30 seconds, where two 30 second interstitials may be used to fill a given interstitial pod).

Optionally, the potential sources for interstitial content may use the context information in determining whether to offer interstitial content and which interstitial content to offer. For example, if a potential source for interstitial content is an ad server, the ad server may determine whether the context information matches any ad specifications, and if so, the ad server may optionally determine a bid for placement of the interstitial content.

At block 414, offers of interstitial content are received by the stitcher system. The offers may include the interstitial content and/or metadata describing the interstitial content (e.g., the genre, subject matter, length, URL, etc.). The offers may optionally include bids (e.g., of a specified amount) for placement of the interstitial content. At block 416, the offers of interstitial content are evaluated (e.g., based on the content metadata, the source of the content, and/or bid amount), and interstitial content from among the offers is selected for the interstitial pods.

At block 418, the stitcher system may use the locator (e.g., URL) for the selected interstitial content to replace a corresponding redirect locator in the redirect database. In addition, beacon URLs associated with the selected interstitial content may be used to populate corresponding redirect entries in the redirect database.

At block 426, the user device video player requests interstitial content using a locator in the playlist manifest that corresponds to an entry in the redirect database. The user device video player may also request beacon URLs corresponding to beacon entries in the redirect database at the appropriate times.

At block 428, the user device video player request is received at the redirect database. At block 440, the redirect database accesses the corresponding redirect locator (URL) corresponding to the request. As discussed elsewhere herein, the redirect locator (URL) may correspond to interstitial content stored by a content distribution network system.

At block 442, the redirect locator is used to request that the corresponding interstitial content be streamed to the stitcher system. At block 444, the stitcher system may receive the interstitial content (e.g., from the content delivery system) corresponding to the redirect locator. If interstitial content is encrypted, the stitcher system may request a decryption key and decrypt the interstitial content. Optionally, instead, the client video player may request the decryption key and decrypt the interstitial content as similarly discussed elsewhere herein.

At block 448, the user device video player may receive the interstitial content corresponding to the redirect locator from the stitcher system. At block 450, the user device video player plays back and renders on a display the interstitial content corresponding to the redirect locator. Optionally, server-side content (e.g., ad) insertion (SSAI) may be invoked to trigger the proxy service and subsequent beacon calls.

Thus, as described herein, techniques are described which enable for quick-start video playback of video-on-demand media (e.g., a movie, episode, comedy special, or other program or content). Further, techniques are described which enable content being played back by a video player or other client to be dynamically changed after a playlist manifest file is downloaded to the client. Still further, described herein are techniques that reduce the amount of beacon traffic from a user device to a remote system.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
   a computer device;
   a network interface;
   non-transitory computer readable memory having program instructions stored thereon that when executed by the computing device cause the system to perform operations comprising:

populating, using a locator proxy service, a redirect data store with redirect locators, the redirect locators corresponding to default media;

receiving from a user device video player, via the network interface, a request for an item of video content;

generating a file, the file comprising locators corresponding to:
one or more redirect data store entries storing redirect locators to default media;

at least partly in response to the request for an item of video content, transmitting, using the network interface, the file comprising one or more locators corresponding to respective redirect data store entries storing redirect locators to default media to the user device;

in response to a first event, replacing a redirect locator in the redirect data store with a redirect locator corresponding to media different than default media associated with the replaced redirect locator;

receiving a request from the user device video player for media, the request directed to a redirect database location storing the redirect locator corresponding to the media different than the default media associated with the replaced redirect locator; and at least partly in response to receiving the request for media, the request directed to the redirect database location, the redirect database location storing the redirect locator corresponding to the media different than the default media, enabling the media different than the default media to be streamed to the user device.

2. The system as defined in claim 1, wherein the system is configured to act as a proxy pass through system, wherein at least partly in response to receiving the request for a first item of video content directed to the redirect database the system is configured to:
request the first item of video content for a remote source;
receive the requested first item of video content from the remote source; and
provide the received first item of video content to the user device.

3. The system as defined in claim 1, wherein the media different than the default media is streamed to the user device from a content distribution system without traversing the system.

4. The system as defined in claim 1, the operations further comprising transmitting context data to potential sources of media, the context data comprising information regarding a user of the user device, wherein the file is transmitted to the user device before the context data is transmitted to the potential sources of media, wherein the context data is configured to be used to proposed media to be streamed to the user device as an interstitial during the request item of video content.

5. The system as defined in claim 1, wherein the item of video content is automatically requested by the video player based at least in part on a comparison of a current time and a scheduled starting time for the item of video content.

6. The system as defined in claim 1, wherein the file comprises an HLS, DASH, RTMP, HDS, or MSS manifest file.

7. The system as defined in claim 1, the operations further comprising:
populating the redirect data store with redirect locators corresponding to one or more beacons;

receiving a request directed to the redirect database location storing the redirect locators corresponding to one or more beacons;

at least partly in response to receiving the request directed to the redirect database location storing the redirect locators corresponding to one or more beacons, causing one or more corresponding HTTP GET requests to be generated.

8. The system as defined in claim 1, the operations further comprising:
including, in the file, locators corresponding to decryption keys for respective segments of the requested item of video content that are encrypted.

9. The system as defined in claim 1, the operations further comprising using server-side content insertion to trigger a proxy service and subsequent beacon calls.

10. The system as defined in claim 1, wherein the file is not alterable by the system after the file is received by the user device.

11. The system as defined in claim 1, wherein the locators included in the file comprise URLs.

12. A computer implemented method, the method comprising:
populating a redirect data store with redirect locators corresponding to default media;

receiving over a network at a first system comprising a computing device, from a remote user device video player, a request for video content;

generating, using the first system, a file, the file comprising locators corresponding to:
one or more redirect data store entries storing respective redirect locators to default media;

in response to the request for video content, transmitting using the first system, over the network to the user device, the file, the file comprising locators corresponding to redirect data store entries storing redirect locators to default media;

replacing a redirect locator to default media in the redirect data store with a redirect locator corresponding to media different than default media associated with the replaced redirect locator;

receiving at the first system a request from the user device directed to a redirect database location storing the redirect locator corresponding to media different than default media associated with the replaced redirect locator; and at least partly in response to receiving the request directed to the redirect database location storing the redirect locator corresponding to the media different than default media associated with the replaced redirect locator, enabling the media different than default media, associated with the replaced redirect locator, to be streamed to the user device.

13. The method as defined in claim 12, the method further comprising:
in response to a receiving a request from the remote user device video player for a first item of media, requesting from a third part system the first item of media;

receiving the requested first item of media from the third part system at the first system; and providing, via the first system, the received first item of media to the user device.

14. The method as defined in claim 12, wherein the media different than the default media is streamed to the user device from a content distribution system without traversing the first system.

15. The method as defined in claim 12, the method further comprising transmitting context data to potential sources of media, wherein the file is transmitted to the user device before the context data is provided to potential sources of media, wherein the context data is configured to be used by potential sources of media in determining media to be proposed for streaming to the user device.

16. The method as defined in claim 12, wherein the video content is automatically requested by the user device video player based at least in part on a comparison of a current time and a scheduled starting time for the video content.

17. The method as defined in claim 12, wherein the file comprises an HLS, DASH, RTMP, HDS, or MSS manifest file.

18. The method as defined in claim 12, the method further comprising:
    populating the redirect data store with redirect locators corresponding to one or more beacons;
    receiving a request from the user device directed to the redirect database location storing the redirect locators corresponding to one or more beacons;
    at least partly in response to receiving the request directed to the redirect database location storing the redirect locators corresponding to one or more beacons, causing one or more corresponding HTTP GET requests to be generated.

19. The method as defined in claim 12, the method further comprising:
    including, in the file, locators corresponding to decryption keys for respective segments of the requested video content that are encrypted.

20. The method as defined in claim 12, the method further comprising using server-side content insertion to trigger a proxy service and subsequent beacon calls.

21. The method as defined in claim 12, wherein the file is not alterable by the system after the file is received by the user device.

22. The method as defined in claim 12, wherein the locators included in the file comprise URLs.

23. Non-transitory computer readable data media that stores computer executable instructions that when executed by a computing device, cause the computing device to perform operations comprising:
    receiving, from a user device video player, a request for a video content;
    generating a playlist, the playlist comprising locators corresponding to:
      entries comprising redirect locators to default media;
    at least partly in response to the request for a video content, transmitting the playlist, comprising locators corresponding to redirect data store entries, in a redirect data store, comprising redirect locators to default media, to the user device;
    replacing a redirect locator to default media in the redirect data store with a redirect locator corresponding to media different than default media associated with the replaced redirect locator;
    receiving from the user device a request directed to a redirect database location storing the redirect locator corresponding to media different than default media associated with the replaced redirect locator; and
    at least partly in response to receiving the request directed to the redirect database location storing the redirect locator corresponding to the media different than default media associated with the replaced redirect locator, enabling the media different than default media associated with the replaced redirect locator to be streamed to the user device.

24. The non-transitory computer readable data media as defined in claim 23, the operations further comprising transmitting context data to potential sources of media, wherein the playlist is transmitted to the user device before the context data is provided to potential sources of media, wherein the context data is configured to be used by potential sources of media in determining media to be proposed for streaming to the user device in association with the request video content.

25. The non-transitory computer readable data media as defined in claim 23, wherein the request directed to the redirect database location storing the redirect locator corresponding to media different than default media associated with the replaced redirect locator is automatically generated based at least in part on a comparison of a current time and a scheduled starting time for the video content.

26. The non-transitory computer readable data media as defined in claim 23, wherein the playlist comprises an HLS, DASH, RTMP, HDS, or MSS playlist.

27. The non-transitory computer readable data media as defined in claim 23, the operations further comprising:
    populating the redirect data store with redirect locators corresponding to one or more beacons;
    receiving from the user device a request directed to the redirect database location storing the redirect locators corresponding to one or more beacons;
    at least partly in response to receiving the request directed to the redirect database location storing the redirect locators corresponding to one or more beacons, causing one or more corresponding HTTP GET requests to be generated.

28. The non-transitory computer readable data media as defined in claim 23, the operations further comprising:
    including, in the playlist, locators corresponding to decryption keys for respective segments of the requested video content that are encrypted.

29. The non-transitory computer readable data media as defined in claim 23, the operations further comprising using server-side content insertion to trigger a proxy service and subsequent beacon calls.

30. The non-transitory computer readable data media as defined in claim 23, wherein the locators included in the playlist comprise URLs.

* * * * *